(12) United States Patent
Takaji et al.

(10) Patent No.: US 7,750,590 B2
(45) Date of Patent: Jul. 6, 2010

(54) DISPLAY APPARATUS HAVING TURNTABLE DISPLAY

(75) Inventors: Masanori Takaji, Fujisawa (JP);
Tatsuya Nakazawa, Kamakura (JP);
Yutaka Yamada, Yokohama (JP);
Toshihiko Matsuzawa, Kamakura (JP);
Satoshi Ishizuka, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 1006 days.

(21) Appl. No.: 11/444,529

(22) Filed: Jun. 1, 2006

(65) Prior Publication Data
US 2006/0290687 A1    Dec. 28, 2006

(30) Foreign Application Priority Data
Jun. 1, 2005    (JP) .............................. 2005-161453

(51) Int. Cl.
*G05D 3/00* (2006.01)
(52) U.S. Cl. ..................... 318/470; 318/445; 318/466; 318/560; 318/563; 318/565
(58) Field of Classification Search ................. 345/905; 318/445, 466, 468, 170, 560, 563, 565, 470
See application file for complete search history.

(56) References Cited

U.S. PATENT DOCUMENTS

| | | | | |
|---|---|---|---|---|
| 4,831,368 A | * | 5/1989 | Masimo et al. ............... 345/27 |
| 5,189,404 A | * | 2/1993 | Masimo et al. ............. 345/659 |
| 5,250,888 A | * | 10/1993 | Yu ............................. 318/640 |
| 6,010,111 A | * | 1/2000 | Cho ....................... 248/346.06 |
| 6,179,264 B1 | * | 1/2001 | Moy et al. ................ 248/349.1 |
| 6,504,707 B2 | * | 1/2003 | Agata et al. ............. 361/679.05 |
| 6,633,286 B1 | * | 10/2003 | Do et al. ...................... 345/205 |
| 7,059,733 B2 | * | 6/2006 | Hoshino et al. ............. 353/122 |
| 7,436,140 B2 | * | 10/2008 | Takaji et al. ................. 318/466 |
| 2005/0194509 A1 | * | 9/2005 | Tsai et al. ................ 248/349.1 |
| 2006/0181688 A1 | * | 8/2006 | Hoshino et al. ............. 353/122 |

FOREIGN PATENT DOCUMENTS

| | | |
|---|---|---|
| CN | 2685952 Y | 3/2005 |
| JP | 2001-285755 A | 10/2001 |

OTHER PUBLICATIONS

English translation of Chinese Office Action issued in Chinese Patent Application No. 200610088517.6, mailed May 8, 2009.

* cited by examiner

*Primary Examiner*—My-Chau T Tran
(74) *Attorney, Agent, or Firm*—McDermott Will & Emery LLP (57) ABSTRACT

A display apparatus includes a base, a display screen part supported on the base turnably, a driving part for turning the display screen part in accordance with an inputted control signal, a turning prevention mechanism for preventing turning of the display screen part, a judgment part for judging on the basis of the inputted control signal whether the display apparatus is operated or not, and a controller for producing a signal for operating the turning prevention mechanism to prevent turning of the display screen part when it is judged that there is no operation to the display screen part and producing a signal for releasing operation of the turning prevention mechanism when it is judged that there is operation to the display screen part.

2 Claims, 6 Drawing Sheets

DISPLAY APPARATUS HAVING TURNTABLE DISPLAY

INCORPORATION BY REFERENCE

The present application claims priority from Japanese application JP2005-161453 filed on Jun. 1, 2005, the content of which is hereby incorporated by reference into this application.

BACKGROUND OF THE INVENTION

The present invention relates to a display apparatus having a display screen part supported on a base turnably.

There has been heretofore proposed an electronic apparatus with a revolving or turning mechanism which can respond to operation of a button of a remote controller to turn the electronic apparatus toward a person or a viewer who operates the remote controller. This proposed electronic apparatus with the turning mechanism includes a remote controller having a light emitting part and an apparatus body having a light receiving part for receiving a remote-control light signal emitted by the light emitting part of the remote controller, a detection part for detecting a light amount of the remote-control light signal received by the light receiving part, an operation part for calculating a turning angle on the basis of the amount of light detected by the detection part and the turning mechanism for turning the electronic apparatus about an axis thereof in accordance with an output of the operation part (refer to JP-A-2001-285755, for example).

SUMMARY OF THE INVENTION

A flat panel display apparatus having a swivel mechanism, such as the electronic apparatus with the turning mechanism proposed above, which can freely turn a display screen of the display apparatus electrically by means of a remote controller and adopts a stand for a desk-top lamp is very convenient. Accordingly, many users often operate the remote controller to turn the display screen of the flat panel display apparatus.

However, there is a possibility that the display screen collides with a wall at the periphery thereof in turning, so that the flat panel display apparatus falls down or collides with various objects placed at the periphery to thereby bring down the objects, so that the objects are damaged or broken. Accordingly, it is necessary to set the turning power of the flat panel display apparatus and the braking power for braking turning to be small. Therefore, when the flat panel display apparatus includes various kinds of switches requiring operation power that is strong to some degree and a device insertable/extractable from the flat panel display apparatus, like an external recording device such as, for example, an external hard disk, mounted integrally to the flat panel display apparatus, it is necessary to decide mounting positions of the switches and the external recording device in the flat panel display apparatus so that the flat panel display apparatus is not turned due to operation of the switches and insertion/extraction operation of the external recording apparatus.

As described above, large restriction is imposed on the mounting positions of the switches and external recording device in the conventional flat panel display apparatus.

Accordingly, it is an object of the present invention to provide a display apparatus with a turnable display screen which cannot receive large restriction on the mounting positions of the various switches and insertable/extractable external components and can set the turning power and the braking power for braking turning to be large.

The display apparatus according to the present invention comprises a base, a display screen part supported on the base turnably, a driving part for turning the display screen part in accordance with an inputted control signal, a prevention mechanism for preventing turning of the display screen part by the driving part, a judgment part for judging whether the display apparatus is operated or not, and a controller for producing a signal for preventing turning of the display screen part by the driving part by means of the prevention mechanism when it is judged that the display apparatus is not operated and releasing the prevention when it is judged that the display apparatus begins to be operated.

According to a preferred embodiment of the present invention, the driving part includes an electric motor and a revolving power transmission mechanism for transmitting revolving power from the electric motor to a support shaft for supporting the display screen part turnably.

According to another embodiment of the present invention, the prevention mechanism includes a resistance gear provided in the revolving power transmission mechanism and meshing with a train of teeth fixedly mounted to the base to suppress revolution of the revolving power transmission mechanism.

According to still another embodiment of the present invention, the prevention mechanism comprises a disk brake mechanism fixedly mounted to the base and slidably contacting to at least one of revolving bodies constituting the revolving power transmission mechanism to suppress revolution of the revolving power transmission mechanism.

According to a further embodiment of the present invention, the display apparatus is operated by a remote controller.

According to a still further embodiment of the present invention, the electric motor and a plurality of revolving bodies constituting the revolving power transmission mechanism are formed to be revolved clockwise and counterclockwise.

According to a different embodiment of the present invention, the display screen part comprises a flat liquid crystal panel display or plasma display panel, and a turning angle of the display screen part is limited within a predetermined angular range.

According to the present invention, the display apparatus with a turnable display screen cannot receive large restriction on the mounting positions of various switches and insertable/extractable external components and can set the turning power and the braking power for braking turning to be large.

BRIEF DESCRIPTION OF THE DRAWINGS

These and other features, objects and advantages of the present invention will become more apparent from the following description when taken in conjunction with the accompanying drawings, wherein.

DESCRIPTION OF THE EMBODIMENTS

Embodiments of the present invention are now described in detail with reference to the accompanying drawings.

Figure 1:
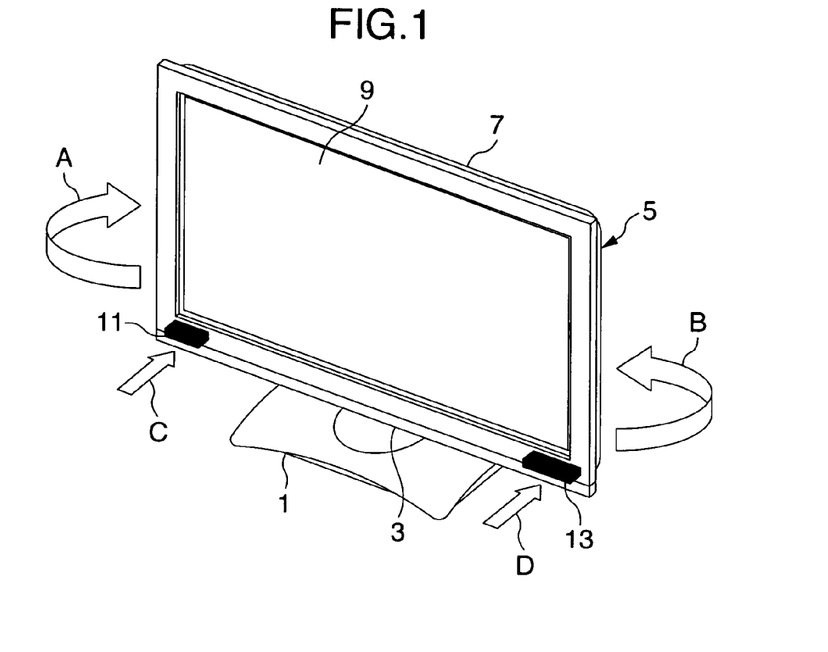
FIG. 1 is a perspective view showing the whole structure of a display apparatus according to an embodiment of the present invention.

FIG. 1 is a perspective view showing the whole structure of a display apparatus according to an embodiment of the present invention.

As shown in FIG. 1, the display apparatus includes a substantially rectangular base 1 and a display screen part 5 supported in a substantially middle part of the base 1 to be turned clockwise and counterclockwise as shown by arrows A and B by means of a revolving power transmission mechanism 3 described later in detail. The base 1 is formed to be a stand for a desk-top lamp, for example, and includes a pair of long sides opposite to each other and curved inside gently. The base 1 is formed to be thin as a whole and have the thickness increased gradually from four corners toward the middle part.

The display screen part 5 is formed into a solid body having an oblong rectangle and a short depth, that is, formed to be thin as a whole. The display screen part 5 includes an outer frame 7 formed into an oblong rectangle and a display screen 9 fitted into the outer frame 7 and formed of, for example, a plasma display panel or a liquid crystal display panel. Various switches 11 for operating the display apparatus are mounted on the lower left end of the front side of the outer frame 7. Further, a front input terminal 13 to which an external recording device (not shown) such as, for example, hard disk, optical disk and memory device like semiconductor memory can be inserted and extracted is mounted on the right lower end of the front side of the outer frame 7.

Figure 2:
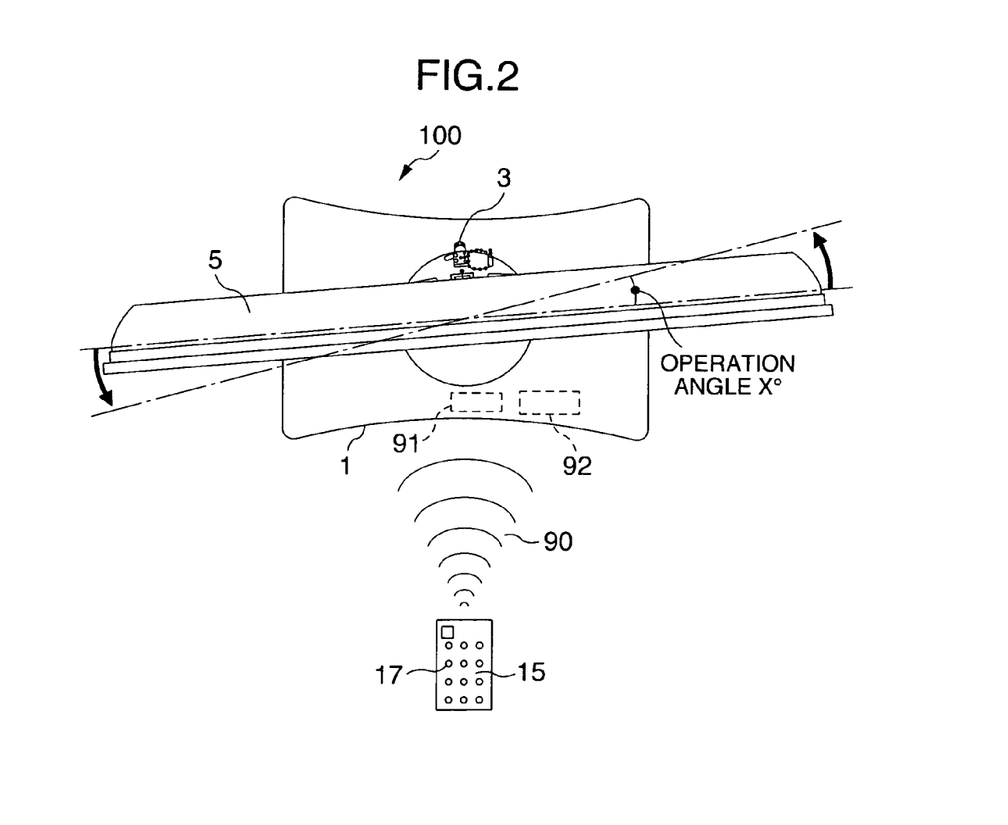
FIG. 2 is an explanatory diagram showing the display apparatus shown in FIG. 1 and a remote controller for remotely controlling the display apparatus.

FIG. 2 is an explanatory diagram showing the display apparatus shown in FIG. 1 and a remote controller for remotely controlling the display apparatus.

Figure 8:
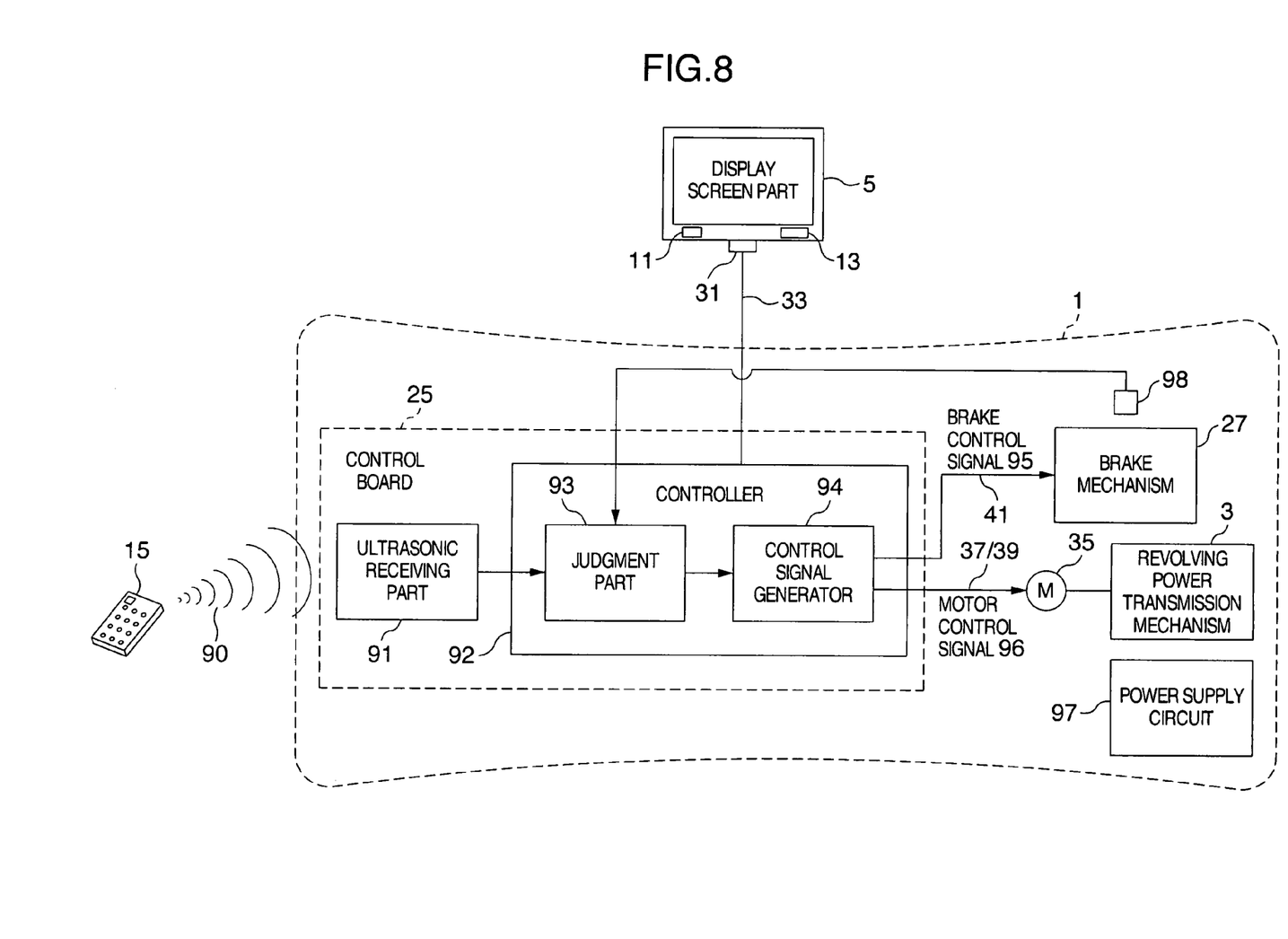
FIG. 8 is a block diagram illustrating a controller according to the present invention.

In FIG. 2, when a user (not shown) operates a desired button of a button group 17 mounted on a remote controller 15 by pressing it, a control signal 90 for the display screen part is transmitted from an ultrasonic transmission part (not shown) included in, for example, the remote controller 15 in response to the pressing operation. The control signal 90 in ultrasonic wave for the display screen part is received by an ultrasonic receiving part 91 (FIG. 8) included in, for example, the base 1 of the display apparatus 100. Consequently, a controller 92 (FIG. 8) responds to the control signal 90 to supply a drive command signal 96 (FIG. 8) to a motor (represented by numeral 35 in FIG. 3) which outputs revolving power to a revolving power transmission mechanism 3 so as to turn the display screen part 5 counterclockwise by an operation angle X° from an initial position.

On the other hand, the controller 92 (FIG. 8) supplies a control signal 95 to a brake mechanism (represented by numeral 27 in FIG. 3 and described in detail with reference to FIG. 3) while the motor 35 is stopped not to be driven. Consequently, the controller 92 controls the brake mechanism 27 to prevent the revolving power transmission mechanism 3 from turning the display screen part by external power other than the revolving power supplied from the motor 35. When a judgment part 93 (FIG. 8) recognizes that the ultrasonic receiving part 91 (FIG. 8) receives the control signal 90 for the display screen part from the remote controller 15 while the brake mechanism 27 prevents the revolving power transmission mechanism 3 from turning the display screen part, a control signal generator 94 (FIG. 8) of the controller 92 supplies a control signal 95 for brake cancellation to the brake mechanism 27 to thereby release the prevention of revolution of the revolving power transmission mechanism 3 by the brake mechanism 27.

Figure 3:
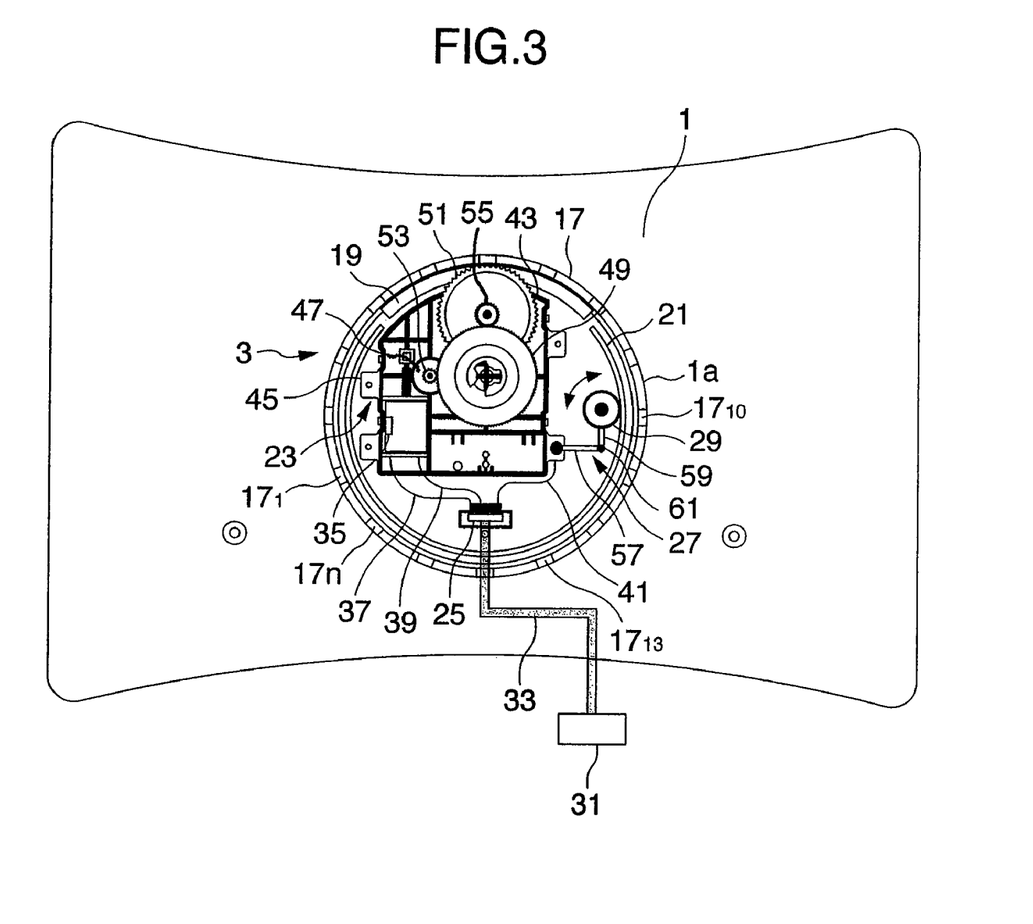
FIG. 3 is a plan view of a base showing a detailed structure of a revolving power transmission mechanism included in the display apparatus according to the embodiment of the present invention.

FIG. 3 is a plan view of the base 1 showing a detailed structure of the revolving power transmission mechanism 3 provided in the display apparatus according to the embodiment of the present invention.

As shown in FIG. 3, the revolving power transmission mechanism 3 of the display apparatus according to the embodiment of the present invention is disposed in a circular recess 1a formed in a substantially middle part of the base 1. The revolving power transmission mechanism 3 includes, as shown in FIG. 3, an outer ring member 17, an inner ring member 19, an arcuated member 21, a turning motion mechanism 23, a control board 25 and the brake mechanism 27. Any remaining members (that is, the outer ring member 17, the inner ring member 19, the arcuated member 21 and the control board 25) except the turning motion mechanism 23 and the brake mechanism 27 of the revolving power transmission mechanism 3 are fixedly mounted in the circular recess 1a.

The outer ring member 17 is to cover other members constituting the revolving power transmission mechanism 3 and includes a plurality of rollers $17_1$ to $17_n$ disposed at substantially equal spaces. The inner ring member 19 having the thickness set to be partially increased and an external diameter slightly smaller than the internal diameter of the outer ring member 17 is disposed on the inner peripheral side of the outer ring member 17 so that the inner ring member 19 is in close proximity to the outer ring member 17. A train of teeth meshing with an internal gear 51 described later is formed at the place corresponding to the part having the increased thickness of the inner ring member 19 on the inner peripheral side of the outer ring member 17 along the inner periphery of the outer ring member 17.

A train of teeth meshing with a resistance gear 29 included in the brake mechanism 27 is formed along the inner periphery of the arcuated member 21 at the place on the inner peripheral side of the arcuated member 21 against which the resistance gear 29 can abut.

The controller 92 (e.g. microcomputer), the ultrasonic receiving part 91, a power supply 97 (FIG. 8) and the like are mounted on the control board 25. A (flat type) cable 33 is connected at one end thereof to a connector 31 with a monitor of the display screen part 5, for example, and at the other end to the control board 25. One ends of motor control signal lines 37 and 39 having the other ends connected to the motor 35 described later and one ends of a brake mechanism control signal line 41 having the other end connected to the brake mechanism 27 are connected to the control board 25.

Signal lines made of flexible material are adopted for the motor control signal lines 37, 39 and the brake mechanism control signal line 41 in consideration of turning motion of the turning motion mechanism 23 (a support member 43 thereof) in the space defined by the inner ring member 19 and the arcuated member 21.

The controller 92 makes transmission and reception of information required mutually between the monitor of the display screen part 5 and the controller 92 through the cable 33 and the connector 31. Further, the controller 92 supplies a motor control signal for driving and stopping the motor 35 to the motor 35 through the motor control signal lines 37, 39 and a brake mechanism control signal for controlling the brake mechanism 27 to the brake mechanism 27 through the brake mechanism control signal line 41.

The turning motion mechanism 23 includes the support member 43, the motor 35, a worm 45, a worm gear 47, a large gear 49, the internal gear 51 and the brake mechanism 27. The turning motion mechanism 23 (support member 43) is adapted to be turned about the support shaft (fixed shaft) constituted by the revolution shaft of the internal gear 51. That is, the turning motion mechanism 23 (support member 43) is turned by revolving the internal gear 51 and stops its turning by stopping the internal gear 51 from being revolved. The bottom of the display screen part 5 shown in FIGS. 1 and 2 is fixed at mounting positions 43a, 43b and 43c of the support member 43 by fastening members (not shown) such as, for example, screws. The motor 35 adopts a stepping motor, for example, revolving clockwise and counterclockwise and is fixedly supported by the support member 43. The motor 35 is revolved clockwise and counterclockwise and is stopped from being revolved as described above by control of the controller 92.

The worm 45 is fixedly mounted to a revolution shaft of the motor 35 concentrically and meshes with the worm gear 47 to transmit the revolving power of the motor 35 to the worm gear 47. A pinion 53 is fixedly mounted to the revolution shaft of the worm gear 47 concentrically. The pinion 53 meshes with the large gear 49 to transmit the revolving power outputted from the motor 35 to the large gear 49 through the worm gear 47 and the worm 45. The large gear 49 meshes with a pinion 55 fixedly mounted to the revolution shaft of the internal gear 51 concentrically to thereby transmit the revolving power outputted through the pinion 53, the worm gear 47 and the worm 45 from the motor 35 to the internal gear 51 through the pinion 55.

The internal gear 51 is fixedly mounted to the circular recess 1a (of the base 1) through the revolution shaft thereof and meshes with the train of teeth formed on the inner peripheral side of the outer ring member 17 as described above. When the resistance gear 29 of the brake mechanism 27 is apart from the train of teeth formed along the inner periphery of the arcuated member 21 as different from the state shown in FIG. 3 by means of the controller 92, the motor 35 is revolved by the controller 92. The revolving power outputted from the motor 35 is transmitted to the internal gear 51 as described above to thereby revolve the internal gear 51.

More particularly, as described above, the internal gear 51 is revolved while the internal gear 51 meshes with the train of teeth formed on the inner peripheral side of the outer ring member 17, so that the turning motion mechanism 23 (support member 43) is turned clockwise and counterclockwise within a predetermined angular range about the support shaft (fixed shaft) constituted by the revolution shaft of the internal gear 51.

As described above, when the remote controller 15 shown in FIG. 2 is not operated by the user, the brake mechanism 27 is operated by the brake control signal 95 from the controller 92 so that the resistance gear 29 of the brake mechanism 27 meshes with the train of teeth formed along the inner periphery of the arcuated member 21 as described with reference to FIG. 3. The resistance gear 29 meshes with the train of teeth to thereby effect braking operation. When the remote controller 15 is not operated by the user, the display screen part 5 is prevented from being turned even if the turning power (shown by arrows A and B of FIG. 1) is given to the display screen part 5 by force caused by the user's operation of the switches 11 and the user's insertion/extraction of the external recording device to the input terminal 13.

The brake mechanism 27 includes a first arm 57, a second arm 59 and the resistance gear 29. The first arm 57 includes one end fixedly attached to the support member 43 and the other end to which one end of the second arm 59 is swingably attached through a rotation shaft 61. The resistance gear 29 is fixedly supported to the other end of the second arm 59. As apparent from the foregoing description, the brake mechanism 27 is controlled by the brake mechanism control signal from the controller 92 so that the second arm 59 is swung about the rotation shaft 61 to mesh the resistance gear 29 with the train of teeth formed along the inner periphery of the arcuated member 21 and separate the resistance gear 29 from the train of teeth.

The controller 92 supplies the brake mechanism control signal to the brake mechanism 27 so that the resistance gear 29 meshes with the train of teeth when the remote controller 15 is not operated by the user and the resistance gear 29 does not mesh with the train of teeth when the remote controller 15 is operated by the user.

Figure 4:
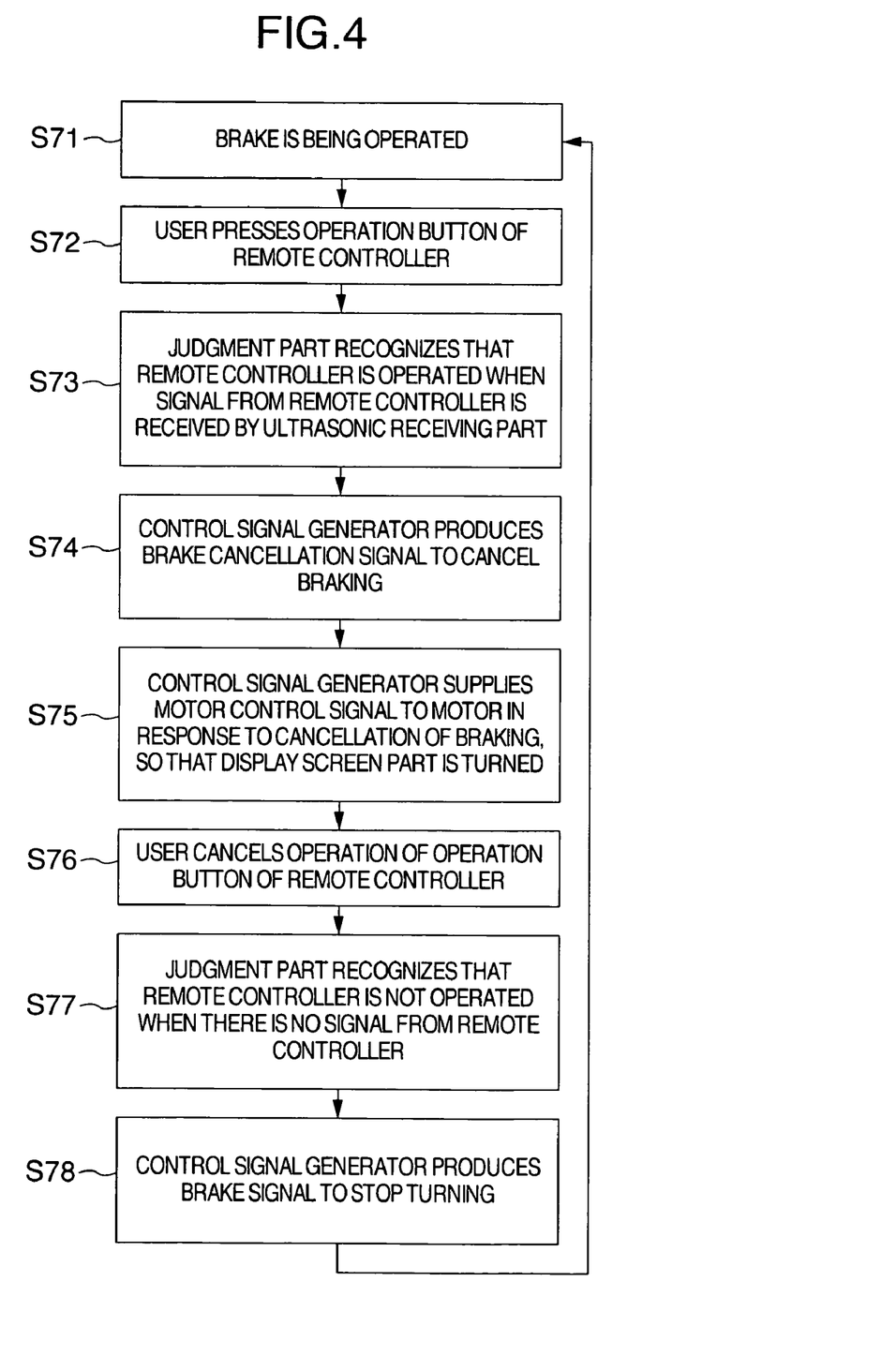
FIG. 4 is a flow chart showing control operation of a brake mechanism in turning and stop of a display screen part according to the embodiment of the present invention.

FIG. 4 is a flow chart showing control operation of the brake mechanism 27 in turning and stop of the display screen part 5 according to the embodiment of the present invention.

In FIG. 4, when it is recognized that the user operates the remote controller 15 (steps S72 to S73) in case where the brake mechanism 27 is operated, that is, in case where the resistance gear 29 meshes with the train of teeth formed along the inner periphery of the arcuated member 21 (step S71), the controller 92 supplies to the brake mechanism 27 the brake mechanism control signal 95 for releasing the meshing of the resistance gear 29 with the train of teeth formed along the inner periphery of the arcuated member 21. When the brake mechanism 27 receives the brake mechanism control signal, the brake mechanism 27 angularly moves or turns the second arm 59 through the rotation shaft 61 counterclockwise in FIG. 3 to thereby release the meshing of the resistance gear 29 with the train of teeth (step S74).

When the judgment part 93 of the controller 92 recognizes on the basis of a signal from a contact switch or an optical sensor 98 (FIG. 8) disposed in close proximity to the brake mechanism 27 that the meshing of the resistance gear 29 with the train of teeth is released, the controller 92 supplies the motor control signal 96 (FIG. 8) to the motor 35 to thereby turn the display screen part 5 (step S75). When the user stops operation of the remote controller 15 (step S76), the controller 92 examines whether the operation of the remote controller by the user 15 is canceled or not. As a result of the examination, when the judgment part 93 recognizes that the operation of the remote controller 15 is canceled (step S77), the controller 92 supplies the motor control signal 96 to the motor 35 to thereby stop the turning of the display screen part 5 (step S78). The controller 92 supplies the brake mechanism control signal 95 to the brake mechanism 27 so that the resistance gear 29 meshes with the train of teeth formed along the inner periphery of the arcuated member 21 again (step S71).

Figure 5A:
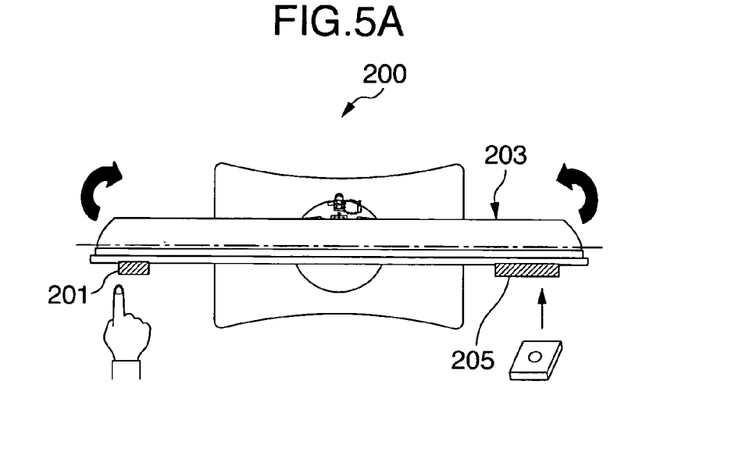
FIGS. 5A, 5B and 5C are plan views for comparing the display apparatus (FIGS. 5B-5C) according to the embodiment of the present invention with a conventional display apparatus (FIG. 5A)
Figure 5B:
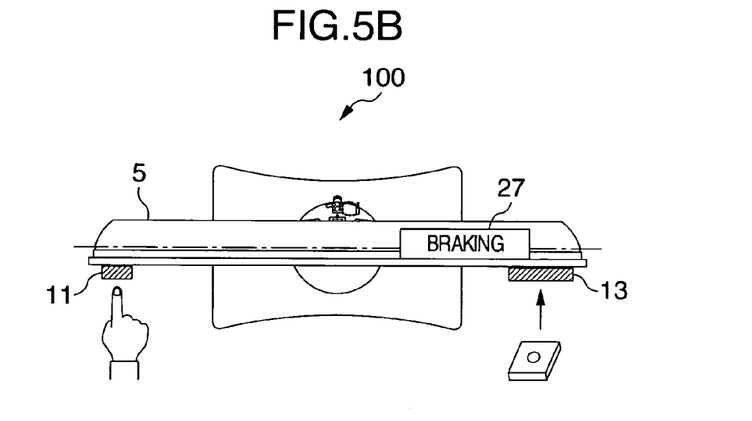
Figure 5C:
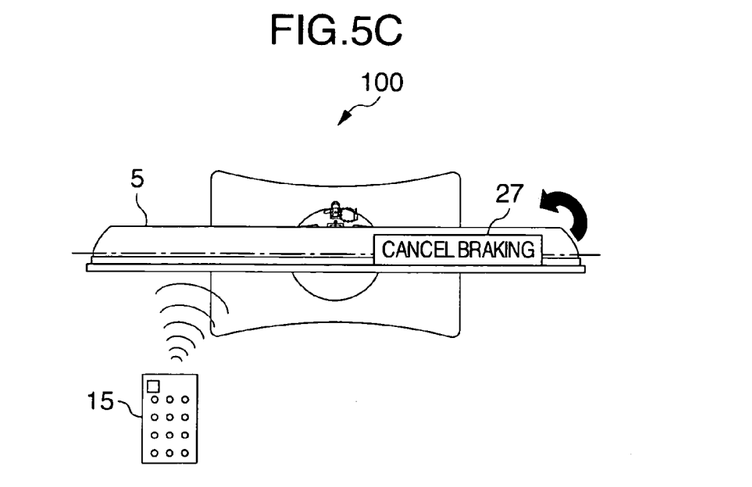

FIGS. 5A, 5B and 5C are plan views for comparing the display apparatus according to the embodiment of the present invention with a conventional display apparatus in operation.

FIG. 5A shows the conventional display apparatus and FIGS. 5B and 5C show the display apparatus according to the embodiment of the present invention.

In the conventional display apparatus, as apparent from FIG. 5A, when the user operates a switch 201 requiring operation power that is strong to some degree, a display screen part 203 is turned clockwise as shown by thick arrow due to the operation power. Further, the display screen part 203 is turned counterclockwise as shown by thick arrow due to force caused when the user inserts into or extracts from a front input terminal 205 an external recording device such as, for example, an external hard disk.

In contrast, in the display apparatus 100 according to the embodiment of the present invention, as apparent from FIG. 5B, when the user does not operate the remote controller 15, the brake mechanism 27 is operated automatically to prevent the display screen part 5 from being turned due to external force. Accordingly, if the switches 11 require the operation power that is strong to some degree, the display screen part 5 is not turned clockwise by the operation power even when the switches are operated with the operation power.

Similarly, when the brake mechanism 27 is operated automatically, the display screen part 5 is not turned counterclockwise as shown by thick arrow by the force caused when the user inserts into or extracts from the front input terminal 13 the external recording device such as, for example, an external hard disk.

As shown in FIG. 5C, however, when the remote controller 15 is operated by the user, the operation of the brake mechanism 27 is canceled automatically and accordingly the display screen part 5 can be turned clockwise or counterclockwise in accordance with the display screen part control signal from the remote controller 15.

As described above, in the display apparatus according to the embodiment of the present invention, large restriction is not imposed on the mounting positions of the switches 11 and the external components or the external recording device which can be inserted and extracted and the turning power and the braking power for braking the turning can be set to be large.

Figure 6:
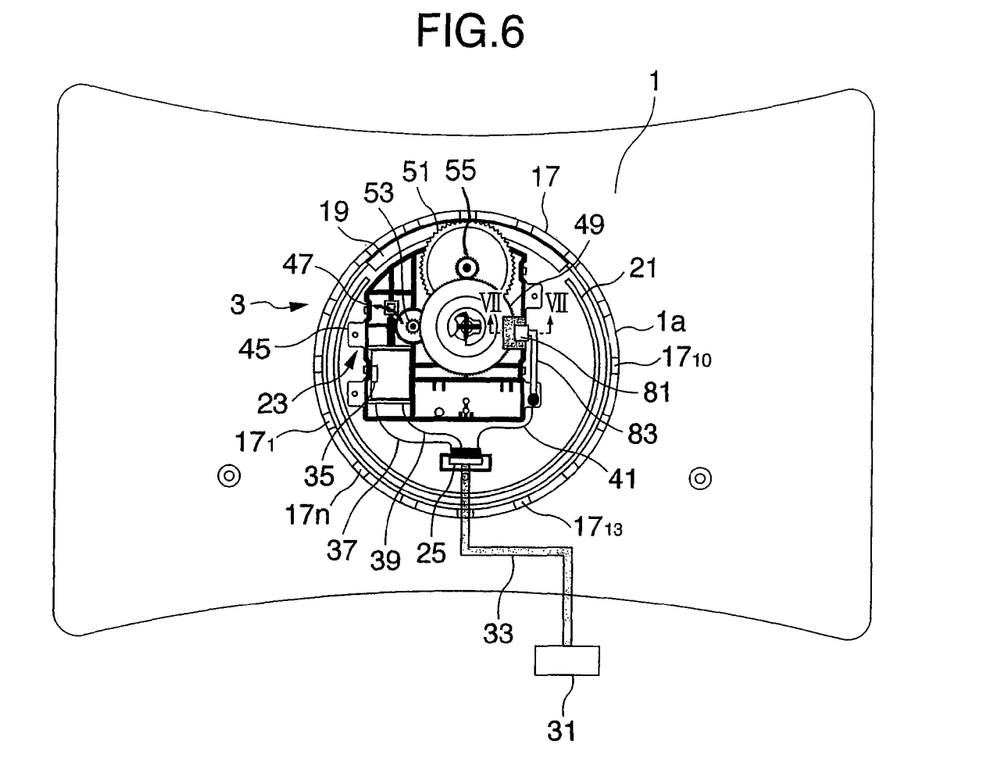
FIG. 6 is a plan view of a base showing a detailed structure of a revolving power transmission mechanism included in a display apparatus according to another embodiment of the present invention.

FIG. 6 is a plan view of a base showing detailed structure of a revolving power transmission mechanism included in a display apparatus according to another embodiment of the present invention.

The display apparatus according to the embodiment of the present invention is different from that of the embodiment shown in FIG. 3 in that the brake mechanism for braking the turning of the turning motion mechanism adopts a disk brake 81 instead of the brake mechanism 27 having the resistance gear 29 shown in FIG. 3. Other structure is the same as shown in FIG. 3 and accordingly in FIG. 6 the same elements as those shown in FIG. 3 are designated by the same reference numerals. Detailed description thereof is omitted. In FIG. 6, numeral 83 denotes an arm for supporting the disk brake 81 swingably (angularly movably) in the vertical direction (in the perpendicular direction to the paper in which FIG. 6 is drawn). The arm 83 is controlled by a disk brake control signal from the controller 92 mounted in the control board 25 to be driven in the same manner as in the embodiment of the present invention shown in FIG. 3.

Figure 7:
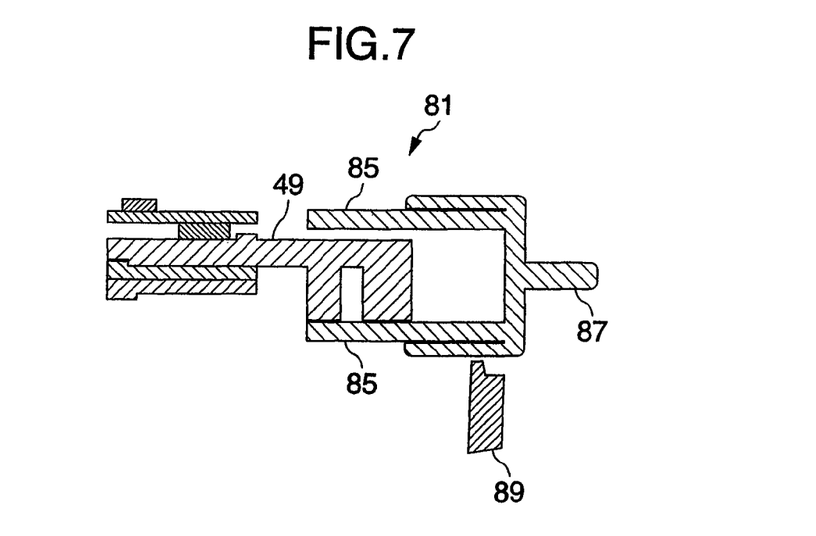
FIG. 7 is a sectional view, taken along line OA-OA of FIG. 6, showing a disk brake shown in FIG. 6.

FIG. 7 is a sectional view, cut along line OA-OA of FIG. 6, showing structure of the disk brake 81 shown in FIG. 6.

As shown in FIG. 7, the disk brake 81 includes a disk brake body 85 having a substantially U-shaped section and a connection part 87 formed integrally with the disk brake body 85 and connected to the arm 83 (shown in FIG. 6). A stopper member 89 for restricting downward movement of the disk brake 81 through the arm 83 (shown in FIG. 6) by causing the bottom of the disk brake body 85 to abut to the stopper member 89 is disposed directly under the disk brake body 85. When the disk brake body 85 is moved downward by means of the arm 83 (shown in FIG. 6) and the bottom of the disk brake body 85 abuts to the stopper member 89, the bottom of the large gear 49 is released from abutting to the disk brake body 85 as shown in FIG. 7, so that the bottom of the large gear 49 is separated from the disk brake body 85. Consequently, the disk brake 81 is shifted from the operation state to the released state.

When the disk brake body 85 is moved up by means of the arm 83 while the bottom of the disk brake body 85 abuts to the stopper member 89, the bottom of the disk brake body 85 is separated from the stopper member 89. Consequently, the disk brake body 85 abuts to the bottom of the large gear 49 to shift the disk brake 81 from the released state to the operation state.

As described above, even in the display apparatus according to the embodiment of the present invention shown in FIG. 6, large restriction is not imposed on the mounting positions of the switches for operating the display apparatus and the external components or the external recording device which can be inserted and extracted and the turning power and the braking power for braking the turning can be set to be large in the same manner as the display apparatus according to the first embodiment of the present invention.

Further, the display screen part control signal 90 transmitted from the remote controller 15 may use electric wave or infrared light instead of ultrasonic signal. In this case, the ultrasonic receiving part 91 is changed to a receiving device capable of receiving electric wave or infrared light. Further, the ultrasonic receiving part 91 may be disposed in the display screen part 5 and connected to the controller 92 by means of the signal line 33.

The preferred embodiments of the present invention have been described, although the embodiments are examples illustrative of the present invention and it is not the gist for limiting the scope of the present invention to the embodiments. The present invention can be implemented even in other various aspects.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

The invention claimed is:

1. A display apparatus comprising:
    a base;
    a display screen part supported on the base turnably;
    a driving part which turns the display screen part in accordance with a driving signal;
    a turning prevention mechanism which prevents turning of the display screen part; and
    a controller which produces the driving signal and operates the turning prevention mechanism based on manipulation to turn the display screen part,
    wherein if the manipulation is not made, the controller operates the turning prevention mechanism so as to prevent turning of the display screen part, and if the manipulation is made, the controller releases the preventing operation by the turning prevention mechanism,
    wherein the driving part includes:
    an electric motor; and
    a revolving power transmission mechanism for transmitting revolving power from the electric motor to a support shaft for supporting the display screen part turnably, and
    wherein the turning prevention mechanism includes a resistance gear provided in the revolving power transmission mechanism and meshing with a train of teeth fixedly mounted to the base to suppress revolution of the revolving power transmission mechanism.

2. A display apparatus comprising:

a base;

a display screen part supported on the base turnably;

a driving part which turns the display screen part in accordance with a driving signal;

a turning prevention mechanism which prevents turning of the display screen part; and a controller which produces the driving signal and operates the turning prevention mechanism based on manipulation to turn the display screen part, wherein if the manipulation is not made, the controller operates the turning prevention mechanism so as to prevent turning of the display screen part, and if the manipulation is made, the controller releases the preventing operation by the turning prevention mechanism, wherein the driving part includes:

an electric motor; and a revolving power transmission mechanism for transmitting revolving power from the electric motor to a support shaft for supporting the display screen part turnably, and wherein the turning prevention mechanism includes a disk brake mechanism fixedly mounted to the base and slidably contacting to at least one of a plurality of revolving bodies constituting the revolving power transmission mechanism to suppress revolution of the revolving power transmission mechanism.

* * * * *